(12) United States Patent
Wang et al.

(10) Patent No.: US 7,412,005 B2
(45) Date of Patent: Aug. 12, 2008

(54) METHOD AND APPARATUS PROVIDING TIME DOMAIN INTERPOLATED CHANNEL ESTIMATION WITH ADVANCED NOISE SUPPRESSION FOR MULTICARRIER TRANSMISSIONS

(75) Inventors: Haifeng Wang, Oulu (FI); Teemu Sipilä, Oulunsalo (FI)

(73) Assignee: Nokia Corporation, Espoo (FI)

( * ) Notice: Subject to any disclaimer, the term of this patent is extended or adjusted under 35 U.S.C. 154(b) by 680 days.

(21) Appl. No.: 10/783,129

(22) Filed: Feb. 19, 2004

(65) Prior Publication Data

US 2005/0185724 A1    Aug. 25, 2005

(51) Int. Cl.
*H04K 1/10* (2006.01)
*H03D 1/10* (2006.01)
*H04B 1/10* (2006.01)

(52) U.S. Cl. .......................... 375/260; 375/340; 375/346

(58) Field of Classification Search .................. 375/150, 375/254, 260, 316, 240, 267, 340, 346, 350; 370/206; 455/39

See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 6,771,591 | B1 * | 8/2004 | Belotserkovsky et al. | 370/210 |
| 2002/0057738 | A1 * | 5/2002 | Klinski | 375/240 |
| 2002/0118771 | A1 | 8/2002 | Larsson | 375/267 |
| 2003/0185314 | A1 | 10/2003 | Kolze | 375/316 |
| 2003/0227866 | A1 * | 12/2003 | Yamaguchi | 370/208 |
| 2004/0184399 | A1 * | 9/2004 | Chiou | 370/206 |
| 2006/0034363 | A1 * | 2/2006 | Wang et al. | 375/233 |
| 2007/0058081 | A1 * | 3/2007 | Kim et al. | 348/607 |

FOREIGN PATENT DOCUMENTS

| | | |
|---|---|---|
| EP | 1 521 413 A2 | 4/2005 |
| WO | WO 03/034644 A1 | 4/2003 |

OTHER PUBLICATIONS

J. A. C. Bingham, "Multicarrier modulation for data trasnmission: An idea whose time has come," *IEEE Commun. Mag.*, vol. 28, pp. 5-14, May 1990.

(Continued)

*Primary Examiner*—Don N Vo
(74) *Attorney, Agent, or Firm*—Harrington & Smith, PC

(57) ABSTRACT

Disclosed is an interpolation procedure for channel estimation that is based on minimum mean-squared error (MMSE) estimates over comb-type pilot signals. The time domain (TD) interpolated channel estimation suppresses, by the use of an advanced noise suppression scheme, the noise jitter that spreads over all or substantially all of the bandwidth of interest. The original channel estimates in the frequency domain (FD) are transformed into the TD by an IFFT function, where in one embodiment a predefined threshold on actual power or accumulative power is used to minimize the noise jitter over the bandwidth. In a further embodiment the channel estimates in the FD are transformed into the TD and the noise jitter is suppressed by preserving the channel estimates at the actual tap delays and setting the others to zeroes. In either embodiment the noise suppressed channel estimates are then transformed into the FD for FD equalization.

56 Claims, 12 Drawing Sheets

OTHER PUBLICATIONS

J. S. Chow, J. C. Tu, and J. M. Cioffi, "A discrete multitone transceiver system for HDSL applications," *IEEE J. Select. Areas Commun.*, vol. 9, pp. 895-908, Aug. 1991.

W. Y. Chen and D. L. Waring, "Applicability of ADSL to support video dial tone in the copper loop," *IEEE Commun. Mag.*, vol. 32, pp. 102-109, May 1994.

W. Y. Zou and Y. Wu, "COFDM: An overview," *IEEE Trans. Broadcast.*, vol. 41, pp. 1-8, Mar. 1995.

3GPP TR 25.892 v0.1.1 (Feb. 2003), "Technical Specification Group Radio Access Network: Feasibility Study for OFDM for UTRAN Enhancement (Release 6)".

J. J. Beek, O. Edfors, M. Sandell, S. K. Wilson, and P. O. Borjesson, "On Channel Estimation in OFDM Systems," IEEE VTC95-Fall, pp. 815-819, Chicago, USA, Jul. 1995.

O. Edfors, M. Sandell, J. J. Beek, S. K. Wilson, and P. O. Borjesson, "OFDM Channel Estimation by Singular Value Decomposition," IEEE VTC96-Spring, pp. 923-927, Atlanta, USA, Apr. 1996.

O.Y. Zhao, and A. Huang, "A Novel Channel Estimation Method for OFDM Mobile Communication Systems Based on Pilot Signals and Transform-Domain Processing," IEEE VTC97-Spring, pp. 2089-2093, Phoenix, USA, May 1997.

M. Hsieh, and C. Wei, "Channel Estimation Techniques Based on Pilot Arrangement in OFDM Systems," IEEE Transactions on Broadcasting, vol. 48, No. 3, Sep. 2002.

J. Rinne, And M. Renfors, "Pilot Spacing in Orthogonal Frequency Division Multiplexing Systems on Practical Channels," IEEE Transactions on Consumer Electronics, vol. 42, No. 4, Nov. 1996.

Sinem Coleri, M. Ergen, A. Puri, and A. Bahai, "Channel Estimation Techniques based on Pilot Arrangement in OFDM Systems," IEEE Transactions on Broadcasting, vol. 48, No. 3, Sep. 2002.Figure 1. Throughput vs. G in PB3 channel and 16QAM.

Hlaing Minn, and Vijay K. Bharagava, "An Investigation into Time-Domain Approach for OFDM Channel Estimation", IEEE Transactions on Broadcasting, Vo. 46, No. 4, Dec. 2000.

\* cited by examiner

TABLE 2

| | PB3 | | VA120 | |
|---|---|---|---|---|
| | QPSK | 16QAM | QPSK | 16QAM |
| TD-PT | 0.5 dB | 1.0 dB | 1.4 dB | 1.0 dB |
| TD-APT | 1.5 dB | 1.0 dB | 0.0 dB | 0.5 dB |
| TD-DS | 2.2 dB | 1.2 dB | 2.0 dB | 1.5 dB |

FIG.12

TABLE 3

| | PB3 | | VA120 | |
|---|---|---|---|---|
| | QPSK | 16QAM | QPSK | 16QAM |
| TD-PT | 30.7% | 53.0% | 34.2% | 70.8% |
| TD-AT | 18.4% | 38.3% | 9.6% | 41.0% |
| TD-DS | 40.9% | 68.1% | 45.1% | 92.0% |

FIG.13

METHOD AND APPARATUS PROVIDING TIME DOMAIN INTERPOLATED CHANNEL ESTIMATION WITH ADVANCED NOISE SUPPRESSION FOR MULTICARRIER TRANSMISSIONS

TECHNICAL FIELD

This invention relates generally to wireless communications systems and methods and, more specifically, relates to systems that use multiple radio frequency (RF) carriers, and even more specifically, relates to multicarrier communications systems and methods, such as Orthogonal Frequency-Division Multiplexing (OFDM) wireless systems and methods.

BACKGROUND

OFDM offers the advantages of improved downlink system capacity, coverage and data rates for packet data services with high spectral efficiency. This is due at least in part to a substantially rectangular spectrum occupancy and the ability to achieve a low-cost implementation using the Fast Fourier Transform (FFT). OFDM has been exploited for wideband data communications over mobile radio channels, high bit rate digital subscriber lines (HDSLs), asymmetric digital subscriber lines (ADSLs), and digital broadcasting. Reference in this regard can be made to the following publications: J. A. C. Bingham, "Multicarrier modulation for data transmission: An idea whose time has come," IEEE Commun. Mag., vol. 28, pp. 5-14, May 1990; J. S. Chow, J. C. Tu, and J. M. Cioffi, "A discrete multitone transceiver system for HDSL applications," IEEE J. Select. Areas Commun., vol. 9, pp. 895-908, August 1991; W. Y. Chen and D. L. Waring, "Applicability of ADSL to support video dial tone in the copper loop," IEEE Commun. Mag., vol. 32, pp. 102-109, May 1994; and to W. Y. Zou and Y. Wu, "COFDM: An overview," IEEE Trans. Broadcast., vol. 41, pp. 1-8, March 1995.

OFDM partitions the entire bandwidth into parallel independent subcarriers to transmit parallel data streams. The relatively longer symbol duration provides increased immunity to inter-symbol interference (ISD. OFDM has received considerable attention as an air interface for evolution of the Universal Mobile Telecommunications System (UMTS) mobile radio systems in the Third Generation Partnership Project (3GPP) forum. Reference in this regard can be made to 3GPP TR 25.892 v0.1.1 (2003-02), "Technical Specification Group Radio Access Network: Feasibility Study for OFDM for UTRAN Enhancement (Release 6)".

Channel estimation plays an important role in OFDM systems that is essential to bit and power allocation and signal detection. Without perfect knowledge of channel state information (CSI), an OFDM system may be inoperative or may incur significant performance loss. Pilot-based channel estimations are widely used to estimate the channel and equalize the received signal for OFDM systems, where the pilot signals are uniformly distributed in the time and/or frequency domain (FD) based on coherent time and frequency. Reference in this regard can be made to J. J. Beek, O. Edfors, M. Sandell, S. K. Wilson, and P. O. Borjesson, "On Channel Estimation in OFDM Systems," IEEE VTC95-Fall, pp. 815-819, Chicago, USA, July 1995, and to O. Edfors, M. Sandell, J. J. Beek, S. K. Wilson, and P. O. Borjesson, "OFDM Channel Estimation by Singular Value Decomposition," IEEE VTC96-Spring, pp. 923-927, Atlanta, USA, April 1996.

A lowpass filter in a transform domain was proposed for suppressing inter-carrier interference (ICI) and additive white Gaussian noise (AWGN) by O. Y. Zhao, and A. Huang, "A Novel Channel Estimation Method for OFDM Mobile Communication Systems Based on Pilot Signals and Transform-Domain Processing," IEEE VTC97-Spring, pp. 2089-2093, Phoenix, USA, May 1997. Second-order interpolation has been shown, see M. Hsieh, and C. Wei, "Channel Estimation Techniques Based on Pilot Arrangement in OFDM Systems," IEEE Transactions on Broadcasting, Vol. 48, No. 3, September 2002, to outperform the linear interpolation with piecewise constant approximation, as in J. Rinne, and M. Renfors, "Pilot Spacing in Orthogonal Frequency Division Multiplexing Systems on Practical Channels," IEEE Transactions on Consumer Electronics, Vol. 42, No. 4, November 1996. Time-domain interpolation is obtained by passing the FD channel estimates into the time domain (TD) through IFFT, zero padding, and converting back to the frequency domain through FFT (see Sinem Coleri, M. Ergen, A. Puri, and A. Bahai, "Channel Estimation Techniques based on Pilot Arrangement in OFDM Systems," IEEE Transactions on Broadcasting, Vol. 48, No. 3, September 2002). The performance of the time-domain interpolation has been evaluated by R. Steele, "Mobile Radio Communications," Pentech Press Limited. London, England, 1992.

SUMMARY OF THE PREFERRED EMBODIMENTS

The foregoing and other problems are overcome, and other advantages are realized, in accordance with the presently preferred embodiments of these teachings.

In accordance with this invention an interpolation scheme is provided for channel estimation that is based on minimum mean-squared error (MMSE) estimates over comb-type pilot signals. The TD interpolated channel estimation suppresses, by the use of an advanced noise suppression scheme, the noise jitter that spreads over all or substantially all of the bandwidth of interest. The original channel estimates in the FD are transformed into the TD by an IFFT function, having a length of the number of pilots per OFDM symbol, where in one embodiment a predefined threshold on actual power or accumulative power is used to minimize the noise jitter over the bandwidth. In a further embodiment the channel estimates in the FD are transformed into the TD and the noise jitter is suppressed by preserving the channel estimates at the actual tap delays and setting the others to zeroes. In either embodiment the noise suppressed channel estimates are then transformed into the FD for FD equalization. Numerical results are used to show that the system throughput is significantly improved by advanced noise suppression in accordance with this invention, as compared to conventional FD linear interpolation.

In the further embodiment the delay estimates for frame synchronization are used directly, and a method transforms the frequency-domain channel estimates into the time domain, preserves the channel impulse response in the time domain at the actual tap delays, nulls the remainder of the channel impulse results by zeroing, and transforms the noise-suppressed channel estimates back into the frequency domain.

In accordance with the first embodiment of the invention the weighting factor for the power or accumulative power threshold is predefined. Preferably the adaptive weighting factor is a tradeoff between noise suppression and estimation accuracy. A larger weighting factor can effectively reduce the noise jitter, but the channel impulse response at the actual channel taps may be ignored. Conversely, a smaller weighting factor can preserve the channel impulse response at the actual channel taps, but the noise jitter may be included as well.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 3-11 are each a graph, where FIG. 3. shows TD channel estimates in Eq. (9) with normalized power in an ITU PB3 channel with G=9 dB.

FIG. 12 shows a Table (Table 2) that illustrates the improvement in dB by the preferred embodiments (TD-PT, TD-APT, TD-CTD) versus the conventional FD linear channel estimation with InfoBER vs. G; and FIG. 13 shows a Table (Table 3) that illustrates the system throughput improvement in percentage by the preferred embodiments (TD-PT, TD-APT, TD-CTD) versus the conventional FD linear channel estimation with Throughput vs. G (G=10 dB).

DETAILED DESCRIPTION OF THE PREFERRED EMBODIMENTS

The comb-type pilot arrangement, where the pilot signals are uniformly distributed within each OFDM block, has been considered and is preferred for use in this invention. The comb-type pilot system provides improved resistance to fast fading channels, where the pilot spacing is much smaller than the coherence bandwidth of the channel. This invention provides there is a channel estimation interpolation scheme that is based the use of MMSE estimates over the comb-type pilot signals.

Figure 1:
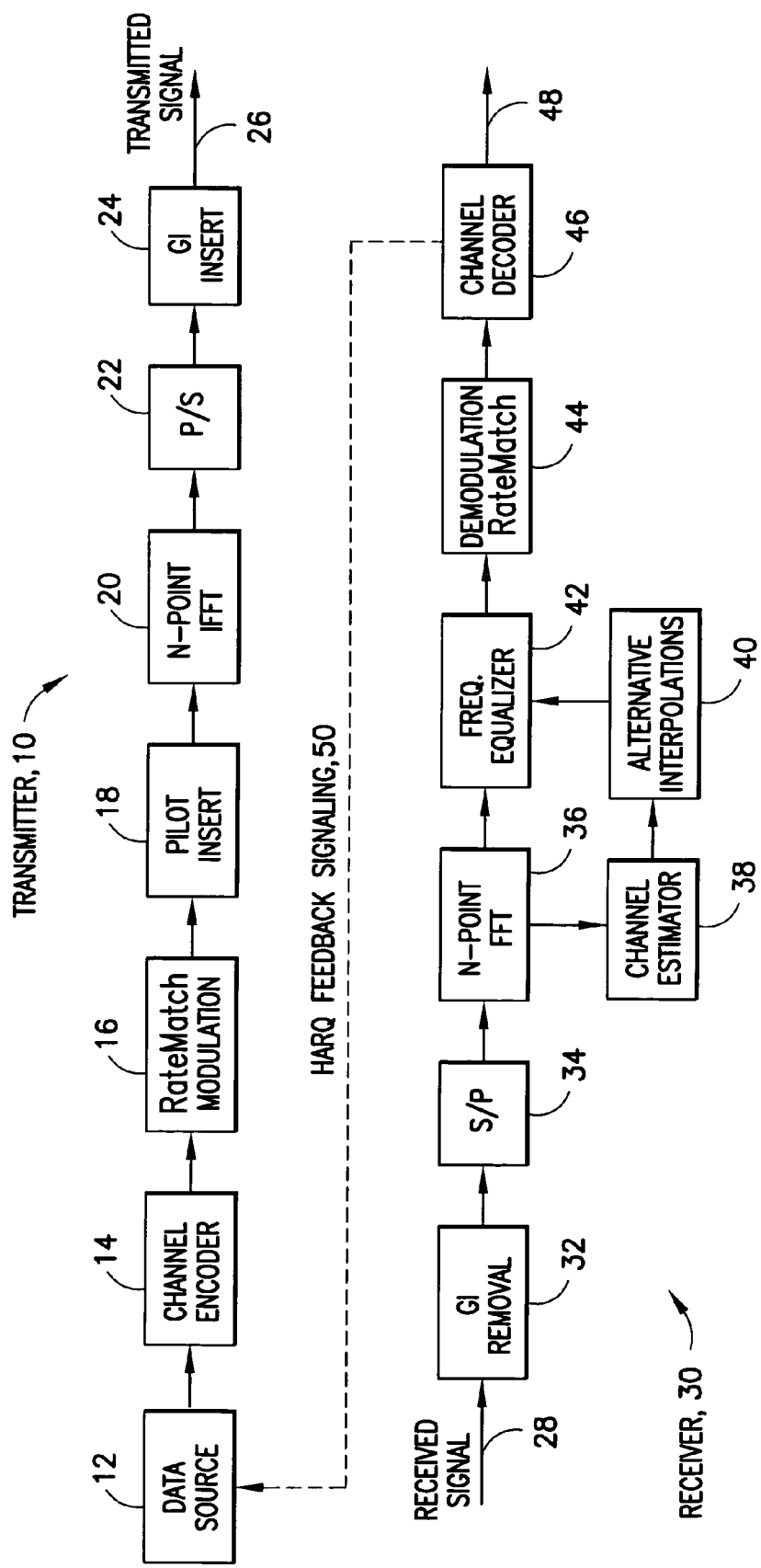
FIG. 1 is a block diagram of a OFDM transceiver that is suitable for practicing this invention.

FIG. 1 is a block diagram of an OFDM transmitter 10 and a OFDM receiver 30 that are suitable for practicing this invention. It should be appreciated that the OFDM transmitter 10 may be embodied in a base station (BS) of a multicarrier communication system, while the OFDM receiver 30 may be embodied in a user equipment (UE) or mobile station (MS), such as a cellular telephone or other type of mobile user device capable of receiving digital voice and/or data signals, such as packet data signals, from the OFDM transmitter 10.

Figure 2:
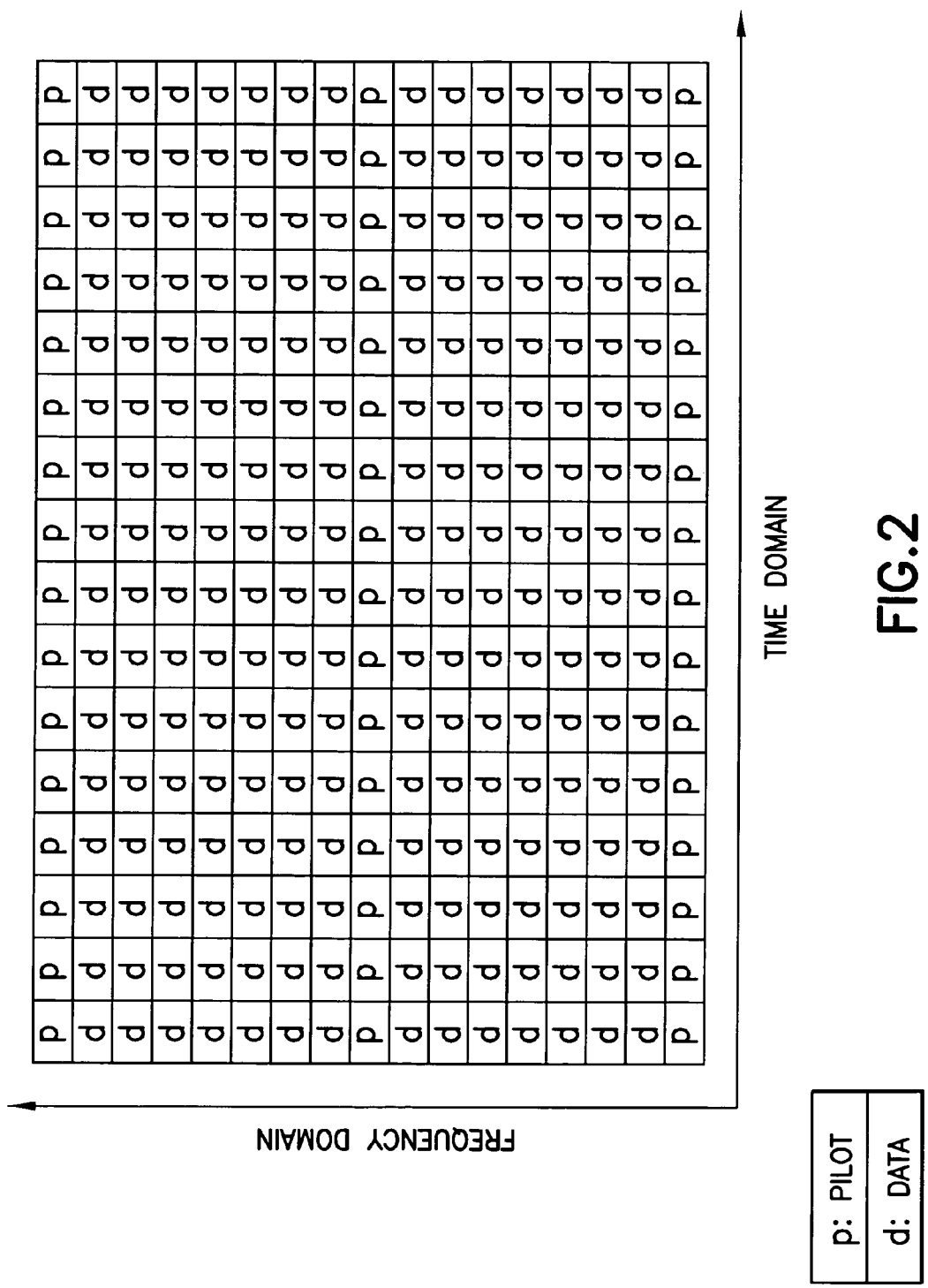
FIG. 2. shows a comb-type pilot structure.

A data source 12 provides information bits that are encoded in a channel encoder 14, then rate-matched and modulated based on an adaptive modulation and coding (AMC) set in block 16. In block 18 the comb-type known pilot symbols are uniformly inserted in the frequency domain, as is shown in FIG. 2, and in block 20 the OFDM transmitter 10 takes an N-point inverse fast Fourier transform (IFFT) of the pilot-added data symbols, such as $$b(n) = IFFT\{B(k)\} = \sum_{k=0}^{N-1} B(k)\exp(j2\pi kn/N) \quad (1)$$

$$n = 0, 1, 2, \ldots, N-1,$$

where B(k) is the data sequence of length N. The output of the IFFT block 20 is converted from parallel-to-serial (P/S) in block 22, and in block 24 is inserted by the redundancy in the form of a guard interval (GI) of length greater than the maximum delay spread, such as $$x(n) = \begin{cases} b(N+n), & n = -G, -G+1, \ldots, -1 \\ b(n), & n = 0, 1, 2, \ldots, N-1, \end{cases} \quad (2)$$

where x(n) is the transmitted signals and G is the GI length. Finally, the GI-added IFFT output x(n) is up-converted at the carrier frequency and becomes a transmitted signal 26 that is sent over a frequency-selective fading channel with AWGN.

The received signal 28 at the receiver 30 of the user equipment (UE) is given by $$r(t)=h(t)\circledast x(t)+n(t), \quad (3)$$

where ⊛ denotes the convolution operation, $$h(t) = \sum_{l}^{L} a_l(t)\delta(t - \tau_l)$$

is the channel impulse response in the time domain, L is the number of paths, $a_l(t)$ is the complex channel coefficient at the lth path, $\tau_l$ is the path delay, $\delta(t)$ is the delta function and n(t) is the additive white Gaussian noise.

In block 32 the GI is removed, in block 34 serial-to-parallel (S/P) conversion is performed, and in block 36 each truncated block is processed by an N-point FFT as follows $$y(n) = r(n+G), \quad n = 0, 1, 2, \ldots, N-1, \quad (4)$$

$$Y(k) = FFT\{y(n)\} = \frac{1}{N}\sum_{n=0}^{N-1} y(n)\exp(-j2\pi kn/N) \quad (5)$$

$$k = 0, 1, 2, \ldots, N-1.$$

Assuming that the bandwidth of each subcarrier is much less than the channel coherence bandwidth, a frequency flat channel model can be assumed at each subcarrier so that only a one-tap equalizer 42 is needed for each subcarrier at the receiver 30. For simplicity, the received pilot signal can be expressed in vector form such as $$Y_P = X_P H_P + I_P + N_P, \quad (6)$$

where $X_P = \text{diag}\{X_P(0), \ldots, X_P(L_P-1)\}$ is the diagonal matrix with known pilot signals, $L_P$ is the number of pilot signals per OFDM symbol, $I_P$ is the vector of ICI and $N_P$ is the vector of Gaussian noise in pilot subcarriers. The channel impulse responses at pilot subcarriers can be obtained based on, by example, MMSE criteria such as $$\hat{H}_P = \left( X_P X_P^H + \frac{1}{SNR} \right)^{-1} X_P^H Y_P, \quad (7)$$

where the average signal-to-noise ratio $SNR = E\{X_P\}/\sigma_n^2$, and $\sigma_n^2$ is the noise variance.

In FIG. 1 block 38 is the channel estimator and block 40 is the unit that performs an interpolation of the channel estimator output, in accordance with this invention. There are a plurality of different embodiments of interpolation that can be employed, where one is a time-domain interpolation function with a power threshold (TD-PT), another is a time-domain interpolation function with an accumulative power threshold (TD-APT), and a still further embodiment is a time-domain interpolation function that is based on channel tap delays (TD-CTD), all in accordance with this invention. The interpolation block 40 may be implemented in circuitry, or in software executed by a data processor, such as by a digital signal processor (DSP), or by a combination of circuitry (hardware) and software. The output of the interpolation block 40 is provided to the frequency equalizer 42. The resulting equalized signal is applied to a demodulator and rate matcher block 44 that corresponds to transmitter block 16. The demodulated and rate matched signal is then applied to a channel decoder 46 that provides a stream of received bits 48 that correspond to the bits output from the transmitter data source 12. An optional path 50 for sending automatic retransmission requests (HARQ) from the receiver 30 to the transmitter 10 may be provided to accommodate the presence of errors in the received bits 48.

In conventional frequency-domain linear interpolation (see J. Rinne, and M. Renfors, "Pilot Spacing in Orthogonal Frequency Division Multiplexing Systems on Practical Channels," IEEE Transactions on Consumer Electronics, Vol. 42, No. 4, November 1996), and more specifically in conventional comb-type pilot based channel estimation methods, two consecutive pilot carriers are used to determine the channel response for data subcarriers that are located in between the pilots such as $$H(k) = \frac{\hat{H}_P(i+1) - \hat{H}_P(i)}{S}(k - iS) + \hat{H}_P(i) \quad (8)$$

$$k = 0, 1, 2, \ldots, N-1 \; \& \; i = \left\lfloor \frac{k}{S} \right\rfloor,$$

where $S = N/L_P$ is the carrier spacing between two consecutive pilots and $\lfloor \; \rfloor$ is the function of round towards minus infinity which rounds the input to the nearest integers that are less than or equal to the input element.

In conventional time-domain interpolation, as in Sinem Coleri, M. Ergen, A. Puri, and A. Bahai, "Channel Estimation Techniques based on Pilot Arrangement in OFDM Systems," IEEE Transactions on Broadcasting, Vol. 48, No. 3, September 2002, and R. Steele, "Mobile Radio Communications," Pentech Press Limited. London, England, 1992, the time-domain interpolation is a high-resolution interpolation based on zero-padding and IFFT/FFT functions. After obtaining the MMSE channel estimates $\hat{H}_P$, one first transforms it into the time domain by $L_P$-point IFFT, such as $$\hat{h}(n) = IFFT\{\hat{H}_P(k)\} = \sum_{k=0}^{L_P-1} \hat{H}_P(k) \exp(j2\pi k n/L_P) \quad (9)$$

$$n = 0, 1, 2, \ldots, L_P - 1.$$

The IFFT preferably has a length of the number of pilots per OFDM symbol. Then the time-domain channel estimate $\hat{h}(n)$ is interpolated by transforming the $L_P$ points into N points with a FFT function such as $$\tilde{H}(k) = FFT\{h(n)\} = \frac{1}{N} \sum_{n=0}^{N-1} h(n) \exp(-j2\pi k n/N) \quad (10)$$

$$k = 0, 1, 2, \ldots, N - 1.$$

where $$h(n) = \begin{cases} \hat{h}(n) & n = 0, 1, 2, \ldots, L_P - 1 \\ 0 & n = L_P, \ldots, N - 1 \end{cases}$$

is the zero-padded time-domain channel estimate.

Figure 3:
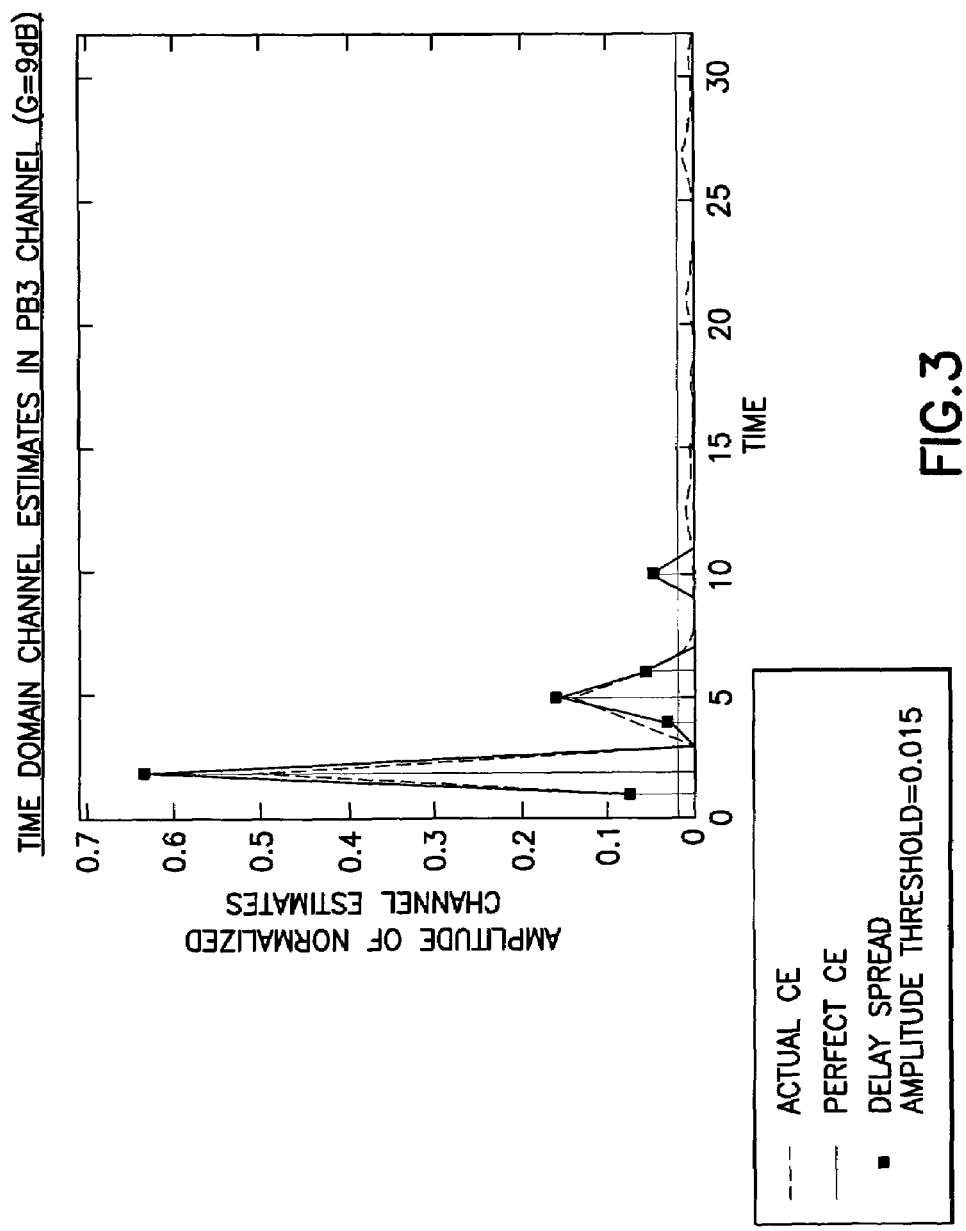
Figure 4A:
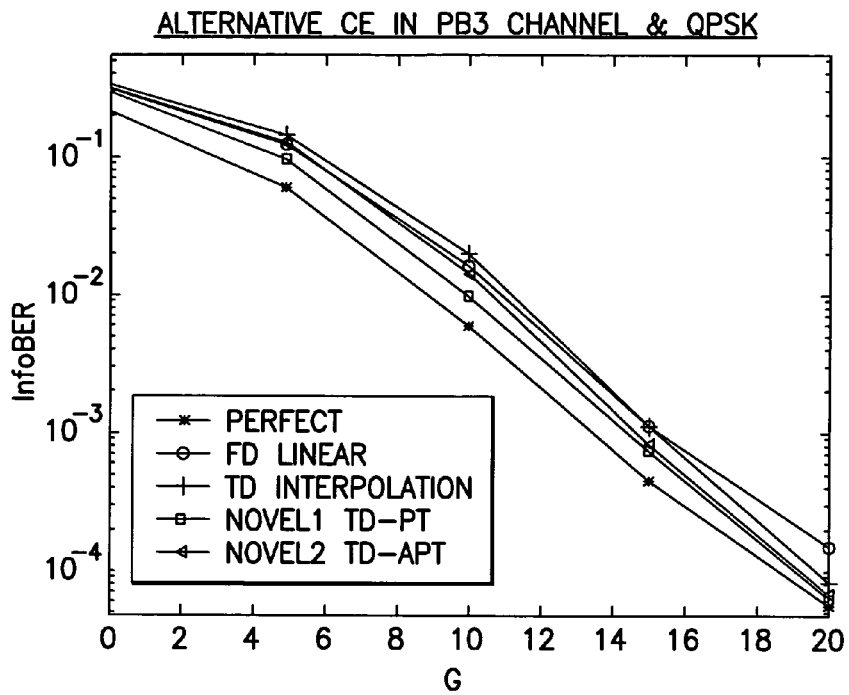
FIGS. 4A and 4B, collectively referred to as FIG. 4, show InfoBER vs. G in a PB3 channel and QPSK modulation.
Figure 4B:
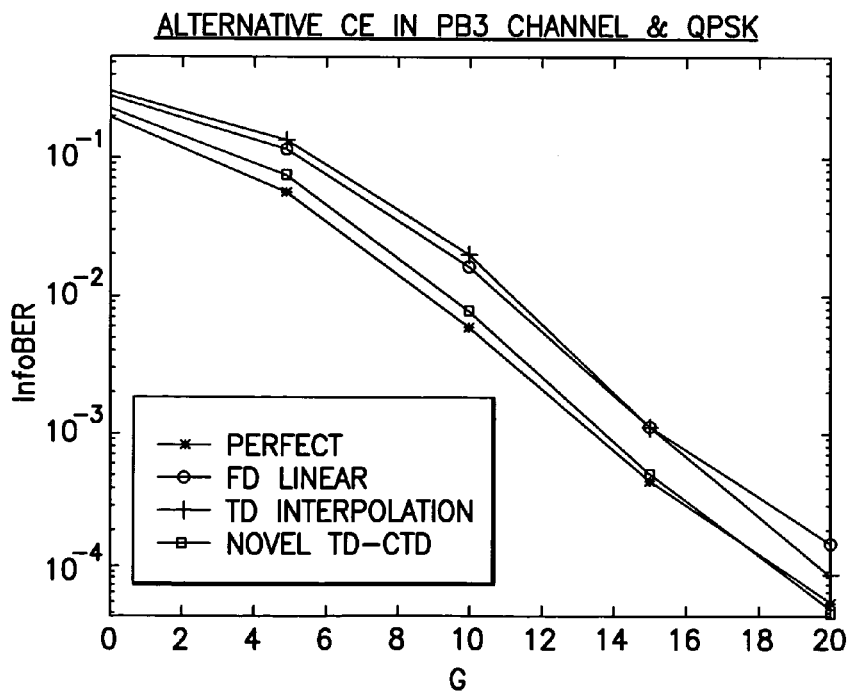
Figure 5A:
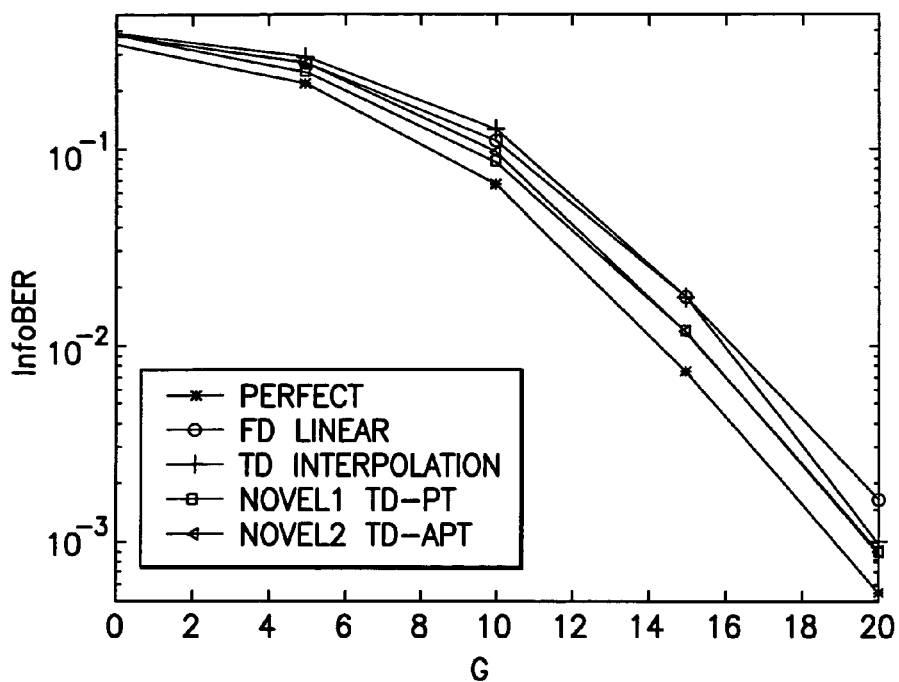
FIGS. 5A and 5B, collectively referred to as FIG. 5, show InfoBER vs. G in the PB3 channel and 16QAM.
Figure 5B:
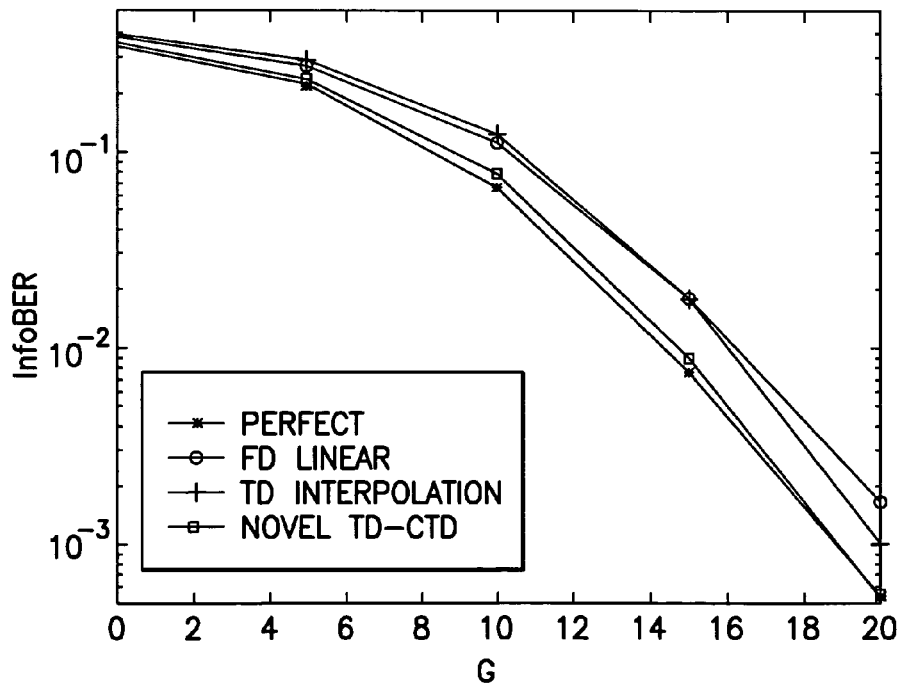
Figure 6A:
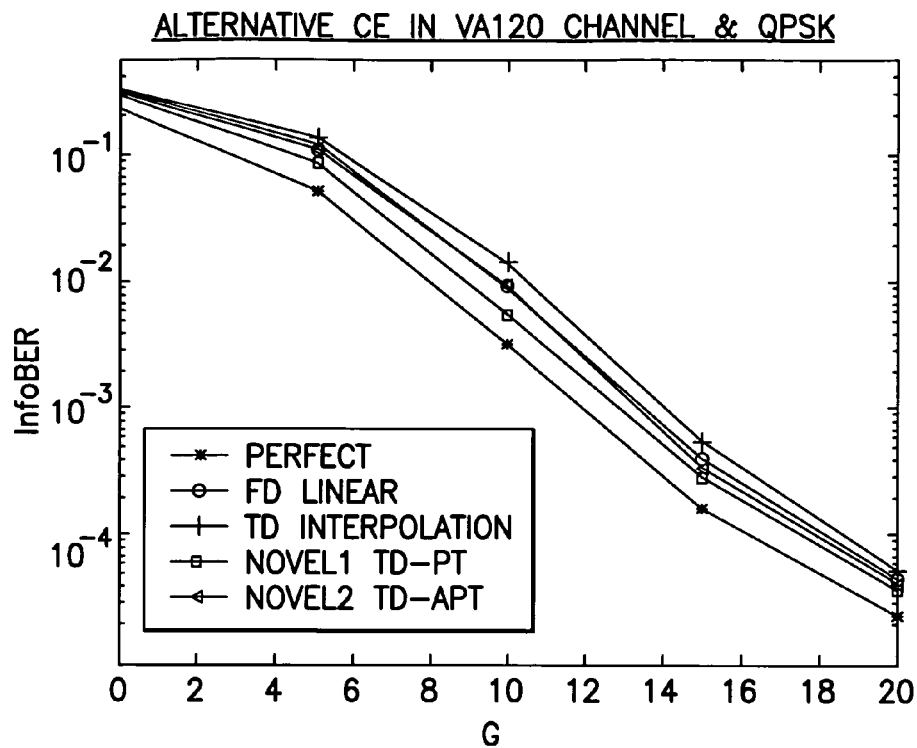
FIGS. 6A and 6B, collectively referred to as FIG. 6, show InfoBER vs. G in a VA120 channel and QPSK modulation.
Figure 6B:
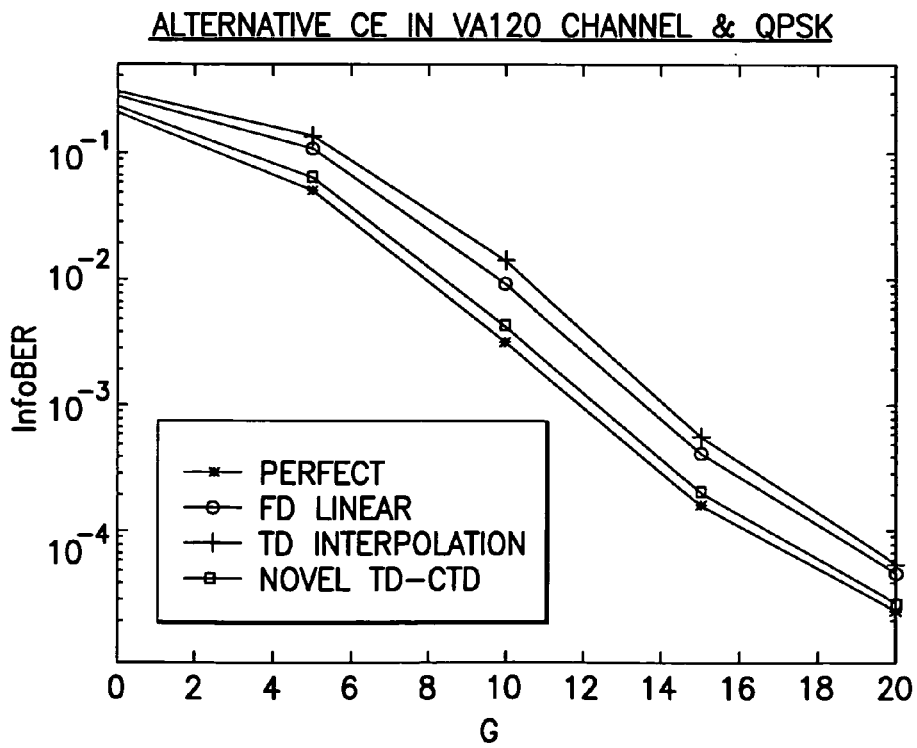
Figure 7A:
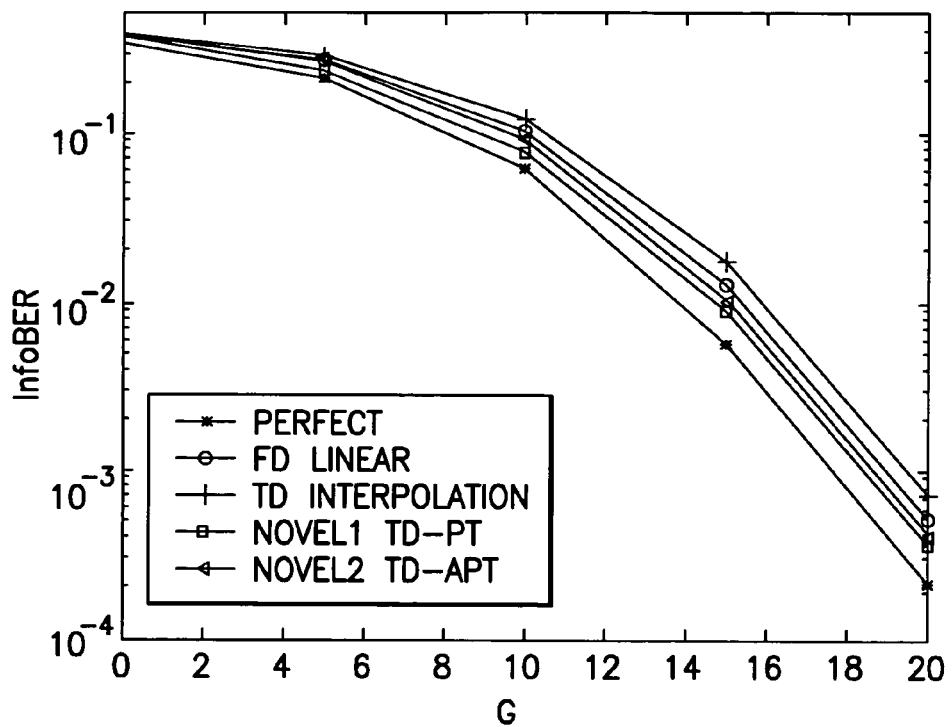
FIGS. 7A and 7B, collectively referred to as FIG. 7, show InfoBER vs. G in the VA120 channel and 16QAM.
Figure 7B:
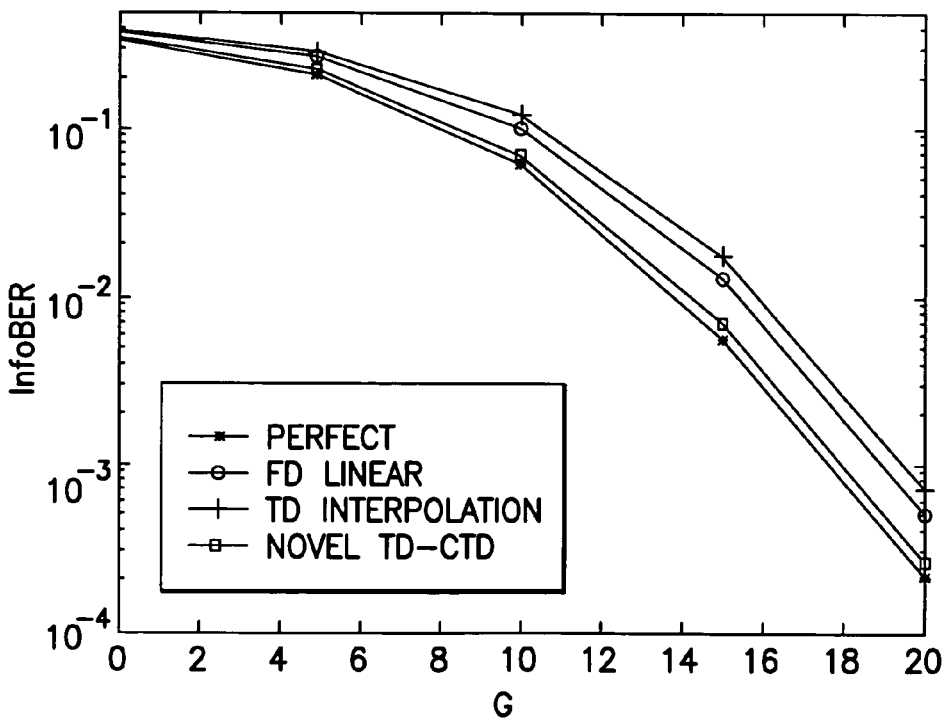
Figure 8A:
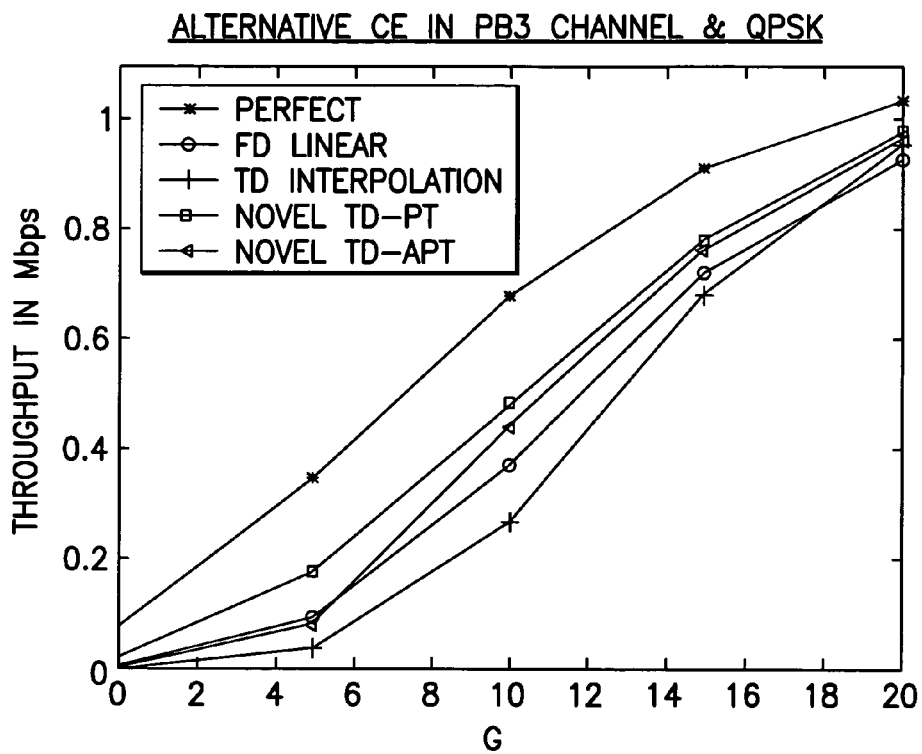
FIGS. 8A and 8B, collectively referred to as FIG. 8, show throughput vs. G in the PB3 channel and QPSK modulation.
Figure 8B:
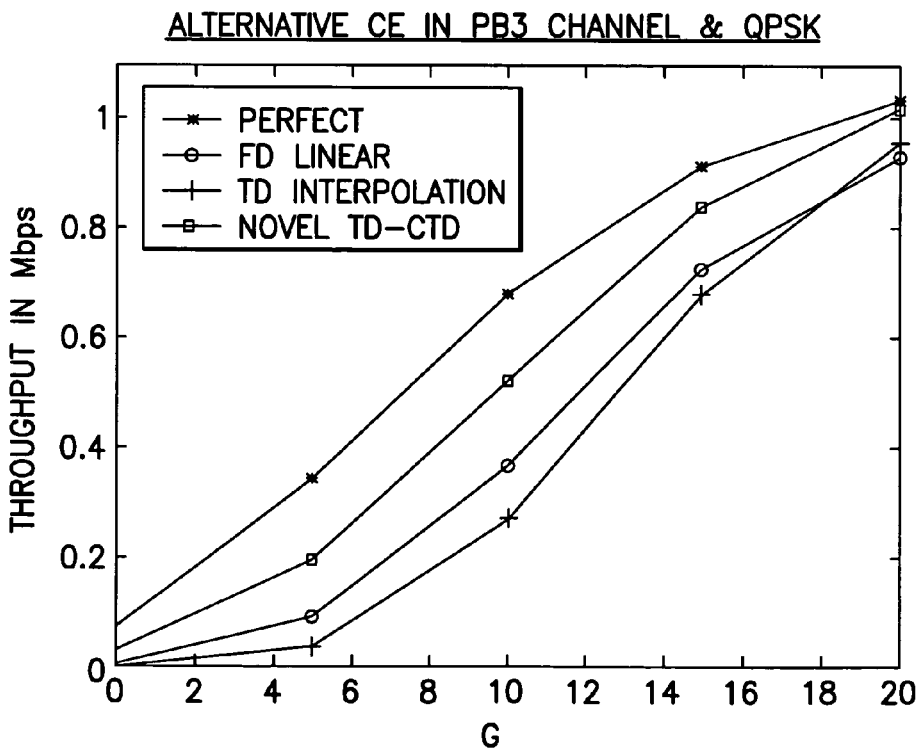
Figure 9A:
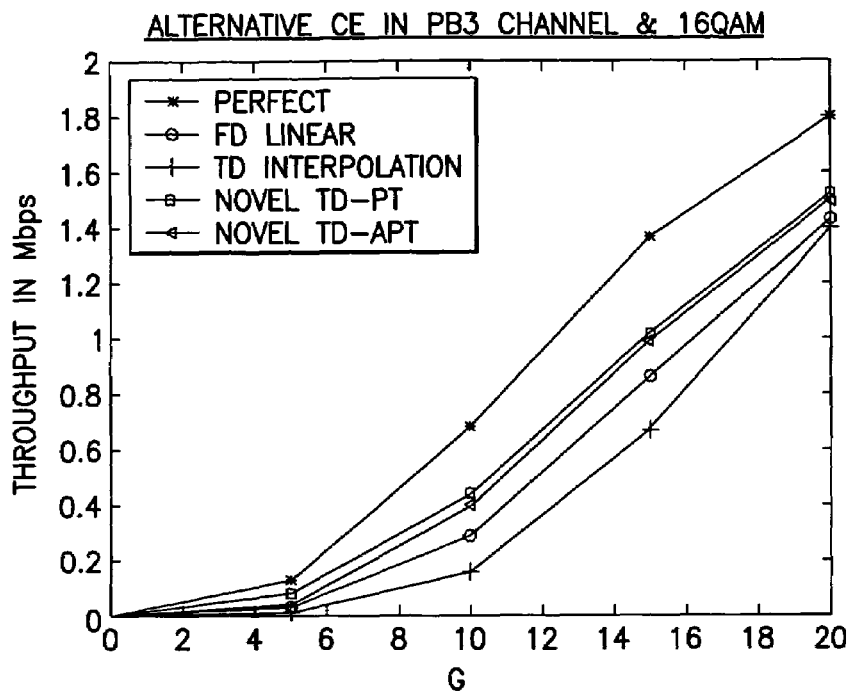
FIGS. 9A and 9B, collectively referred to as FIG. 9, show throughput vs. G in the PB3 channel and 16QAM.
Figure 9B:
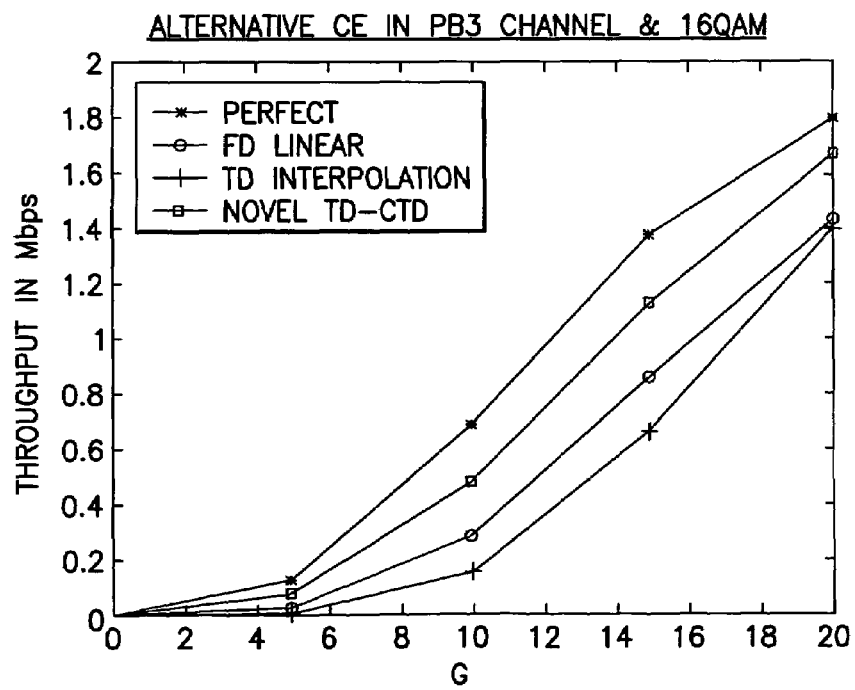
Figure 10A:
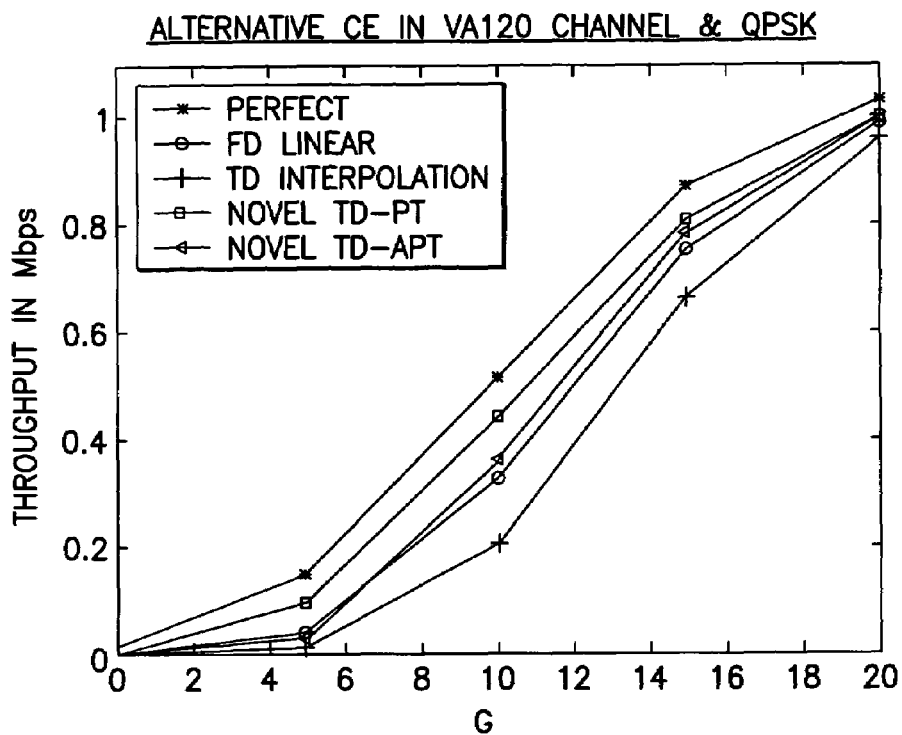
FIGS. 10A and 10B, collectively referred to as FIG. 10, show throughput vs. G in the VA120 channel and QPSK modulation.
Figure 10B:
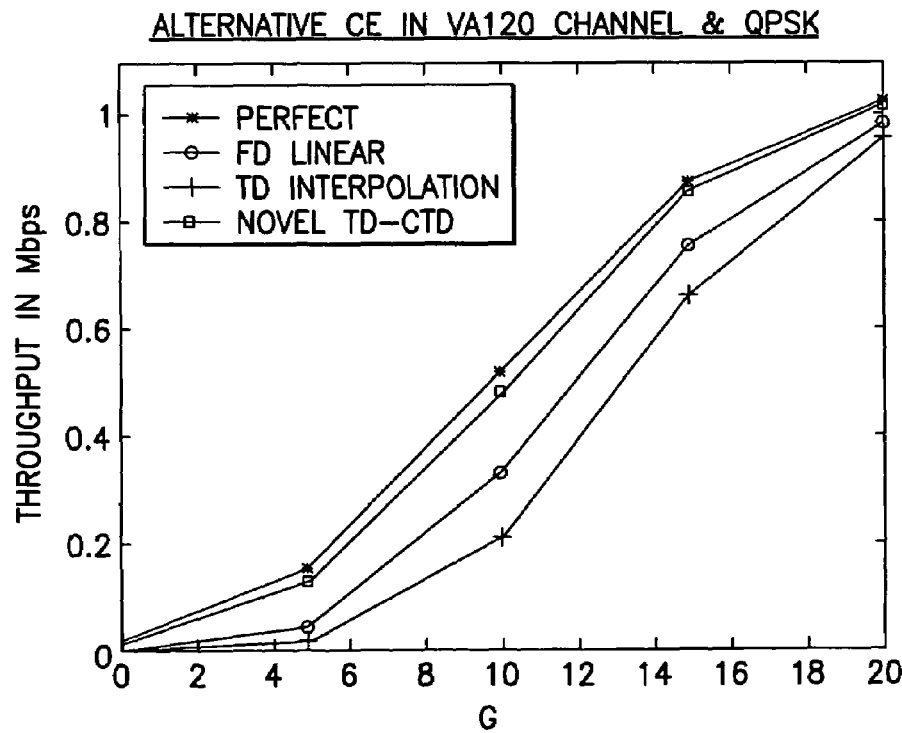
Figure 11A:
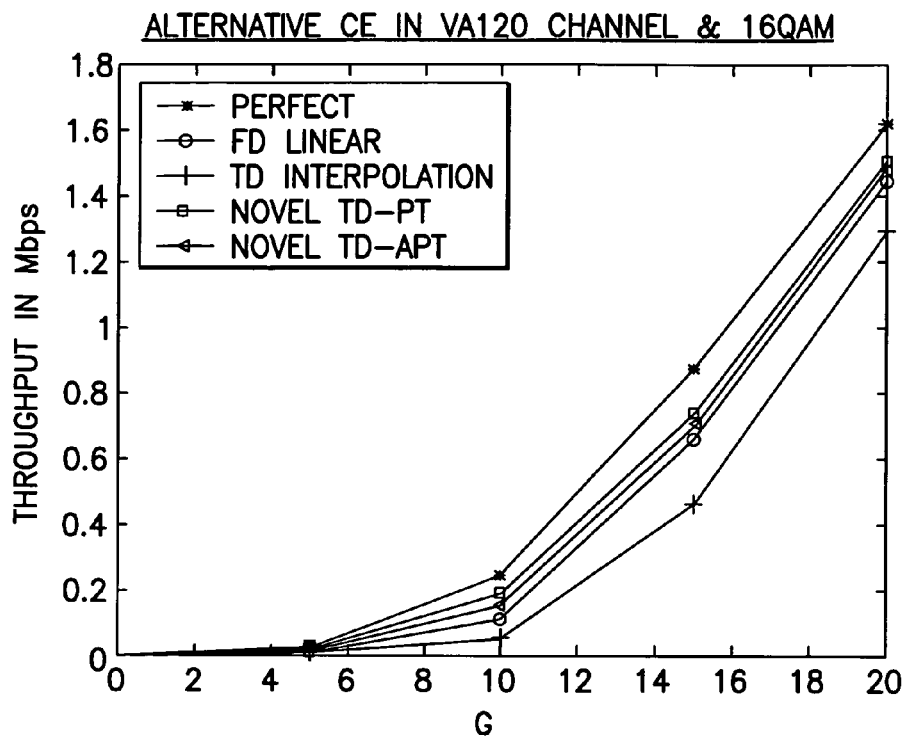
FIGS. 11A and 11B, collectively referred to as FIG. 11, show throughput vs. G in the VA120 channel and 16QAM, where in each of FIGS. 4-11 the A designated Figure plots the time-domain interpolation function with a power threshold (TD-PT) and the time-domain interpolation function with an accumulative power threshold (TD-APT) in accordance with first embodiments of this invention, while the B designated Figure plots the time-domain interpolation function that is based on channel tap delays (TD-CTD) in accordance with a further embodiment of this invention.
Figure 11B:
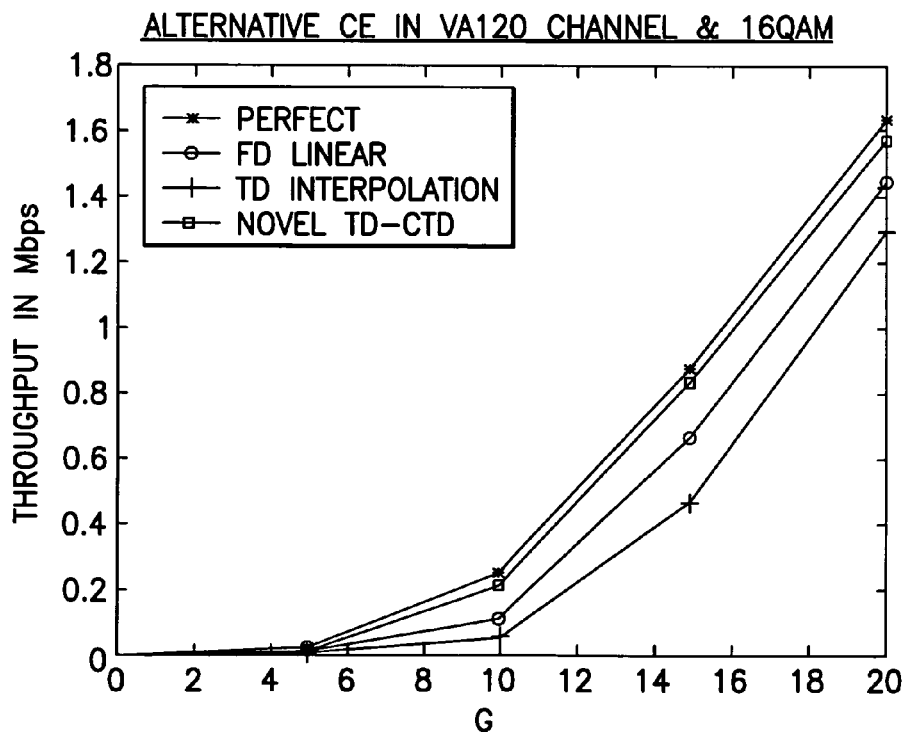

In accordance with a first embodiment of this invention, there is provided by the blocks 38 and 40 of FIG. 1 a channel estimation time-domain interpolation with a power threshold (TD-PT). The FD perfect and actual MMSE channel estimates in the ITU PB3 channel are transformed into the TD as in Equation (9) and power-normalized, as is illustrated in FIG. 3. It is noted that G=Ior/(Ioc+N0), and is the geometry value that applies to the distance between the base station and the user equipment, where Ior is the total base station transmission power, Ioc is the power of the intercell interference and N0 is the noise power.

It can be noticed that the noise is spread over the entire time-domain. In this embodiment of the invention a first novel interpolation scheme with a power threshold is provided, which suppresses the spread noise jitter in the time domain. The time-domain channel estimates with power larger than the predefined power threshold are preserved. Otherwise, the channel estimates with power less than the predefined power threshold are set to zeros as follows, $$\tilde{h}(n) = \begin{cases} \hat{h}(n) & \text{if } |\hat{h}(n)|^2 > P_t \\ 0 & \text{otherwise,} \end{cases} \quad (11)$$

where $|\;|$ implies the absolute value, $P_t = pP_{all}$ is the power threshold, p is a weighting factor, and $$P_{all} = \sum_{n=0}^{L_p-1} |\hat{h}(n)|^2$$

is the total power of the time-domain channel estimates. As can be seen in FIG. 3, the noise jitter over the entire time-domain can be minimized by setting to zero those channel estimates whose power is less than the power threshold. The power threshold is defined as $p=0.015^2$ in FIG. 3. The time-domain channel estimates above the power threshold are preserved and transformed into the frequency domain, as in Equation (10) for the frequency equalization that occurs in block 42 of FIG. 1.

If the system is designed to operate at a constant signal-to-noise ratio operation point, a constant p can be defined that provides sufficient performance. In a time varying environment the power threshold can be adapted most optimally based on the noise and interference power. The value of p may be defined to be just above the noise floor level. Assuming that the noise and interference is Gaussian distributed with variance $\sigma^2$, the weighting factor can be defined according to the desired confidence level of selecting actual channel taps. For example, if $p=3.84\sigma^2$ or $p=6.66\sigma^2$ based on properties of the Normal distribution, the confidences would be 95% or 99%, respectively. In practice, more convenient values can be used, e.g. factor 4 would correspond to a slightly greater confidence than 95%. It can be noticed from FIG. 3 that the adaptive weighting factor is the tradeoff between noise suppression and estimate accuracy. A larger weighting factor can effectively reduce the noise jitter, but real channel taps may be ignored, and vice versa.

In an alternative embodiment there is provided a time-domain interpolation function with an accumulative power threshold (TD-APT). In this alternative embodiment the power of the time-domain channel estimates is ordered as follows $$i_n = \text{ORDER}\{|\hat{h}(n)|^2\}\ n=0,1,2,\ldots,L_P-1, \quad (12)$$

where ORDER { } is the function to sort elements in ascending order and return an array of indices. Then the power of the time-domain channel estimates is accumulated from largest to smallest and a threshold on the accumulative power is set for zeroing the channel estimates outside of the threshold region, such as $$\tilde{h}(n) = \begin{cases} \hat{h}(i_n) & \text{if } \sum_{m=n}^{L_p-1} |\hat{h}(i_m)|^2 < \rho P_{all},\ n = L_p-1,\ldots,0 \\ 0 & \text{otherwise,} \end{cases} \quad (13)$$

where 90%<ρ<95% is the percentage factor which is typically defined to be about one.

Then the time-domain channel estimates with the accumulative power threshold and zero setting can be transformed into the frequency domain as in Equation (10) for frequency equalization.

In a still further embodiment of this invention there is provided a technique for time-domain interpolation based on channel tap delays (TD-CTD). The channel tap delays are estimated for frame synchronization in OFDM system in order to resist ISI with GI removal. The inventors have realized that by using the knowledge of the tap delays, the channel estimation can be improved significantly. From FIG. 3 it can be noticed that most of the power of the channel impulse responses is allocated at the corresponding tap delays in the time domain, while the remainder is basically the noise jitter. In this embodiment of the invention the block 40 of FIG. 1 uses time-domain interpolation with the knowledge of the CTD to suppress the noise jitter. The channel estimates in the FD are first transformed into the TD as in Equation (9). Then, only the TD channel estimates at the actual channel tap delays are preserved while the remainder are set to zeros as follows:

$$\tilde{h}(n) = \begin{cases} \hat{h}(n) & \text{if } n \in \Gamma, n = 0,\ldots,L_p-1 \\ 0 & \text{otherwise,} \end{cases} \quad (14)$$

where $\Gamma=\{\tau_l\}$ l=1,...,L is the vector of the tap delays. Time-domain channel estimates with CTD-based noise suppression can then be transformed into the frequency domain as in Equation (10) for use by the frequency equalization block 42.

The TD interpolated channel estimation with alternative power thresholds (PT, APT), as well as channel tap delays (CTD), disclosed above were evaluated in an OFDM downlink system, where the simulation specifications are shown in Table 1.

TABLE 1

| Simulation Specifications | |
|---|---|
| Systems | OFDM Downlink |
| Carrier Frequency | 2 GHz |
| Sampling Frequency | 3.84 MHz |
| FFT | 512 |
| Guard Interval | 36/37 |
| Subcarrier spacing | 7.5 kHz |
| Pilot Signals | Comb-type with 10% of total basestation power |
| Pilot spacing | 16 subcarriers/120 kHz |
| Channel Coding | 3 GPP ⅓ Turbo |
| Modulation | QPSK & 16 QAM (Pilot only in QPSK) |
| HARQ | Maximum 3 retransmissions with 7 TTI delay |
| HARQ Feedback Signaling | Perfect |
| Channel Estimation | MMSE with alternative interpolations |
| Channel | ITU PB3 & VA120 |

FIGS. 4 through 7 illustrate the alternative channel estimations in ITU PB3 and VA120 channels with QPSK and 16QAM modulation by InfoBER (coded Bit Error Rate) vs. G. The advanced channel estimations made possible by the use of this invention significantly outperform the conventional schemes, and can approach the performance of the perfect scheme with a high G value. With a target InfoBER of $10^{-2}$, and the conventional FD linear scheme as a benchmark, the improvements made possible by the embodiments of the channel estimations are summarized in Table 2 of FIG. 12, which shows the improvement in dB by the preferred embodiments (TD-PT, TD-APT, TD-CTD) over the conventional FD linear channel estimation with InfoBER vs. G.

FIGS. 8 through 11 illustrate the alternative channel estimations in ITU PB3 and VA120 channel with QPSK and 16QAM modulation by system throughput vs. G. With G=10 dB, and the conventional FD linear scheme as the benchmark, the system throughput improvements made possible by the embodiments of the channel estimations are summarized in Table 3 of FIG. 13, which shows the system throughput improvement in percentage by the preferred embodiments (TD-PT, TD-APT, TD-CTD) versus the conventional FD linear channel estimation with Throughput vs. G (G=10 dB).

By way of conclusion, it is known that the accuracy of the channel estimation has a large impact on the system throughput of multicarrier transmissions, and the conventional FD linear interpolation does not work well in OFDM DL communication especially for high velocity due to the fast Doppler and limited pilot overhead. In this invention, novel TD interpolated channel estimations with advanced noise suppression are described for multicarrier transmissions. In first embodiments the channel estimates in the FD are transformed into the TD and the noise jitter is suppressed by the use of the power threshold or the accumulative power threshold techniques. Then the noise suppressed channel estimates are transformed into the FD for FD equalization. In a further embodiment the channel estimates in the FD are transformed into the TD and the noise jitter is suppressed by preserving the channel estimates at the actual tap delays and setting the others to zeroes. The noise suppressed channel estimates are then transformed into the FD for FD equalization.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent circuit and mathematical approaches may be attempted by those skilled in the art. Further, while described above in the context of the channel estimation being based on minimum mean-squared error (MMSE) estimation over the, preferably, comb-type pilot signals, other estimation schemes, such as least squares estimation, can be also employed. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
transforming frequency domain channel estimates into the time domain;
suppressing noise jitter in the time domain channel estimates through one of the following techniques: 1) power-normalizing the time domain channel estimates and preserving the time domain channel estimates with power above a predefined threshold and setting a remainder of the time domain channel estimates to zero, 2) ordering the time domain channel estimates by power and accumulating the so-ordered time domain channel estimates from highest power to lowest until a threshold on the accumulated power is met and then setting a remainder of the time domain channel estimates to zero, and 3) preserving the time domain channel estimates at actual channel tap delays and setting a remainder of the time domain channel estimates to zero; and
transforming the noise suppressed time domain channel estimates back to the frequency domain for frequency domain equalization.

2. A method as in claim 1, where the channel estimation is based on minimum mean-squared error (MMSE) estimation over comb-type pilot signals.

3. A method as in claim 1, where the frequency domain channel estimates are transformed into the time domain channel estimates by use of an inverse fast Fourier transform (IFFT) function having a length of the number of pilots per symbol.

4. A method as in claim 1, where suppressing noise jitter comprises using a predefined threshold of actual power or accumulative power to minimize the noise jitter over the bandwidth.

5. A method as in claim 1, where suppressing noise jitter comprises using channel delay estimates made for frame synchronization purposes, preserving the channel estimates at actual tap delays and setting the others to zero.

6. A method as in claim 4, where suppressing noise jitter comprises preserving time-domain channel estimates with power larger than a predefined power threshold, and setting to zero those channel estimates with power less than the predefined power threshold as follows, $$\tilde{h}(n) = \begin{cases} \hat{h}(n) & \text{if } |\hat{h}(n)|^2 > P_t \\ 0 & \text{otherwise,} \end{cases}$$

where | | indicates the absolute value, $P_t = pP_{all}$ is the power threshold, p is a weighting factor, and $$P_{all} = \sum_{n=0}^{L_p-1} |\hat{h}(n)|^2$$

is the total power of the time domain channel estimates, $\hat{h}$ is a time domain transfer function that describes the channel estimates, $\tilde{h}$ is a time domain transfer function that describes the channel estimates with noise jitter removed, and n is an index in the time domain.

7. A method as in claim 6, where in a time varying environment the power threshold is adapted based on noise and interference power.

8. A method as in claim 4, where suppressing noise jitter comprises ordering time-domain channel estimates as:

$$i_n = \text{ORDER}\{|\hat{h}(n)|^2\} n = 0,1,2,\ldots,L_p-1,$$

where ORDER { } is a function to sort elements in ascending order and return an array of indices, further comprising accumulating the power of the time-domain channel estimates from largest to smallest, and setting a threshold on the accumulated power for zeroing the channel estimates outside of the threshold region in accordance with:

$$\tilde{h}(n) = \begin{cases} \hat{h}(i_n) & \text{if } \sum_{m=n}^{L_p-1} |\hat{h}(i_m)|^2 < \rho P_{all}, n = L_p-1,\ldots,0 \\ 0 & \text{otherwise,} \end{cases}$$

where | | indicates the absolute value, 90% < p <95% is a percentage factor typically defined to be about one, $L_p$ is the number of pilot signals per symbol, $P_{all}$ is the total power of the time-domain channel estimates, $\hat{h}$ is a time domain transfer function that describes the channel estimates, $\tilde{h}$ is a time domain transfer function that describes the channel estimates with noise jitter removed, n is an index in the time domain, m is an index of ordered elements, and $i_m$ and $i_n$ represent an ordered element corresponding to a sorted channel estimate.

9. A method as in claim 5, where suppressing noise jitter comprises preserving those time domain channel estimates at actual channel tap delays and setting the remainder to zero by:

$$\tilde{h}(n) = \begin{cases} \hat{h}(n) & \text{if } n \in \Gamma, n = 0, \ldots, L_p - 1 \\ 0 & \text{otherwise,} \end{cases}$$

where $\Gamma = \{\tau_l\}$ $l=1, \ldots, L$ is a vector of the tap delays, $L_p$ is the number of pilot signals per symbol, $\hat{h}$ is a time domain transfer function that describes the channel estimates, $\tilde{h}$ is a time domain transfer function that describes the channel estimates with noise jitter removed, n is an index in the time domain, and $i_n$ represents an ordered element corresponding to a sorted channel estimate.

10. A method as in claim 1, where the noise suppressed time domain channel estimates are transformed back to frequency domain for frequency domain equalization by a FFT operation having a length of the number of all subcarriers.

11. A method as in claim 1, where the channel estimation is based on a least squares estimation over comb-type pilot signals.

12. An apparatus comprising:
a channel estimator;
a frequency equalizer; and
a channel estimation interpolation function to suppress noise jitter over a bandwidth of interest, comprising a unit to transform frequency domain channel estimates into the time domain; a unit to suppress the noise jitter in the time domain channel estimates through one of the following techniques: 1) power-normalizing the time domain channel estimates and preserving the time domain channel estimates with power above a predefined threshold and setting a remainder of the time domain channel estimates to zero, 2) ordering the time domain channel estimates by power and accumulating the so-ordered time domain channel estimates from highest power to lowest until a threshold on the accumulated power is met and then setting a remainder of the time domain channel estimates to zero, and 3) preserving the time domain channel estimates at actual channel tap delays and setting a remainder of the time domain channel estimates to zero; and a unit to transform the noise suppressed time domain channel estimates back to the frequency domain for input to said frequency equalizer.

13. An apparatus as in claim 12, where said channel estimator performs minimum mean-squared error (MMSE) estimation over comb-type pilot signals.

14. An apparatus as in claim 12, where frequency domain channel estimates are transformed into the time domain channel estimates by use of an inverse fast Fourier transform (IFFT) function having a length of a number of pilots per symbol.

15. An apparatus as in claim 12, where said channel estimation interpolation function uses a predefined threshold of actual power or accumulative power to minimize the noise jitter over the bandwidth.

16. An apparatus as in claim 12, where said channel estimation interpolation function uses channel delay estimates made for frame synchronization purposes, and preserves channel estimates at actual tap delays and sets the others to zero.

17. An apparatus as in claim 15, where said channel estimation interpolation function preserves time-domain channel estimates with power larger than a predefined power threshold, and sets to zero those channel estimates with power less than the predefined power threshold as follows, $$\tilde{h}(n) = \begin{cases} \hat{h}(n) & \text{if } |\hat{h}(n)|^2 > P_t \\ 0 & \text{otherwise,} \end{cases}$$

where | | indicates the absolute value, $P_t = pP_{all}$ is the power threshold, p is a weighting factor, and $$P_{all} = \sum_{n=0}^{L_p-1} |\hat{h}(n)|^2$$

is the total power of the time domain channel estimates, $\hat{h}$ is a time domain transfer function that describes the channel estimates, $\tilde{h}$ is a time domain transfer function that describes the channel estimates with noise jitter removed, and n is an index in the time domain, m is an index of ordered elements.

18. An apparatus as in claim 17, where in a time varying environment the power threshold is adapted based on noise and interference power.

19. An apparatus as in claim 15, where said channel estimation interpolation function orders time-domain channel estimates as:

$i_n = \text{ORDER}\{|\hat{h}(n)|^2\} n = 0,1,2,\ldots,L_p-1$, where ORDER { } is a function to sort elements in ascending order and return an array of indices, and further comprises an accumulator to accumulate the power of the time-domain channel estimates from largest to smallest and sets a threshold on the accumulated power for zeroing the channel estimates outside of the threshold region in accordance with:

$$\tilde{h}(n) = \begin{cases} \hat{h}(i_n) & \text{if } \sum_{m=n}^{L_p-1} |\hat{h}(i_m)|^2 < \rho P_{all}, n = L_p-1, \ldots, 0 \\ 0 & \text{otherwise,} \end{cases}$$

where | | indicates the absolute value, 90% <p <95% is a percentage factor typically defined to be about one, $L_p$ is the number of pilot signals per symbol, $P_{all}$ is the total power of the time-domain channel estimates, $\hat{h}$ is a time domain transfer function that describes the channel estimates, $\tilde{h}$ is a time domain transfer function that describes the channel estimates with noise jitter removed, n is an index in the time domain, m is an index of ordered elements, and $i_m$ and $i_n$ represent an ordered element corresponding to a sorted channel estimate.

20. An apparatus as in claim 16, where said channel estimation interpolation function preserves time domain channel estimates at actual channel tap delays and sets the remainder to zero by:

$$\tilde{h}(n) = \begin{cases} \hat{h}(n) & \text{if } n \in \Gamma, n = 0, \ldots, L_p - 1, \\ 0 & \text{otherwise,} \end{cases}$$

where $\Gamma = \{\tau_l\}$ $l=1, \ldots, L$ is a vector of the tap delays.
where | | indicates the absolute value, 90% <p <95% is a percentage factor typically defined to be about one, $L_p$ is the number of pilot signals per symbol, $P_{all}$ is the total power of the time-domain channel estimates, $\hat{h}$ is a time domain transfer function that describes the channel estimates, h˜ is a time domain transfer function that describes the channel estimates with noise jitter removed, n is an index in the time domain, m is an index of ordered elements, and $i_m$ and $i_n$ represent an ordered element corresponding to a sorted channel estimate.

21. An apparatus as in claim 12, where the noise suppressed time domain channel estimates are transformed back to frequency domain for frequency domain equalization by a FFT operation having a length of the number of all subcarriers.

22. An apparatus as in claim 12, where the channel estimation is based on a least squares estimation over comb-type pilot signals.

23. A receiver of an orthogonal frequency division multiplex (OFDM) multicarrier wireless communications system, comprising:
   a channel estimator operable to perform estimation over received pilot signals to obtain channel estimates;
   an equalizer operating in the frequency domain; and
   a channel estimation interpolation function to suppress noise over a bandwidth of interest, comprising a unit to transform frequency domain channel estimates into the time domain; a unit to suppress the noise in the time domain channel estimates through one of the following techniques: 1) power-normalizing the time domain channel estimates and preserving the time domain channel estimates with power above a predefined threshold and setting a remainder of the time domain channel estimates to zero, 2) ordering the time domain channel estimates by power and accumulating the so-ordered time domain channel estimates from highest power to lowest until a threshold on the accumulated power is met and then setting a remainder of the time domain channel estimates to zero, and 3) preserving the time domain channel estimates at actual channel tap delays and setting a remainder of the time domain channel estimates to zero; and a unit to transform the noise suppressed time domain channel estimates back to the frequency domain for input to said equalizer, where frequency domain channel estimates are transformed into the time domain channel estimates by use of an inverse fast Fourier transform (IFFT) function having a length of a number of pilots per OFDM symbol, and where the noise suppressed time domain channel estimates are transformed back to the frequency domain for frequency domain equalization by a FFT operation having a length of the number of all subcarriers.

24. A receiver as in claim 23, where said channel estimator is operable to perform one of minimum mean-squared error (MMSE) or least squares estimation.

25. A receiver as in claim 23, where said channel estimation interpolation function uses a predefined threshold of actual power or accumulative power to minimize the noise over the bandwidth.

26. A receiver as in claim 22, where said channel estimation interpolation function uses channel delay estimates made for frame synchronization purposes, and preserves channel estimates at actual tap delays and sets the others to zero.

27. A receiver as in claim 25, where said channel estimation interpolation function preserves time-domain channel estimates with power larger than a predefined power threshold, and sets to zero those channel estimates with power less than the predefined power threshold as follows, $$\tilde{h}(n) = \begin{cases} \hat{h}(n) & \text{if } |\hat{h}(n)|^2 > P_t \\ 0 & \text{otherwise,} \end{cases}$$

where | | indicates the absolute value, $P_t = pP_{all}$ is the power threshold, p is a weighting factor, and $$P_{all} = \sum_{n=0}^{L_p-1} |\hat{h}(n)|^2$$

is the total power of the time domain channel estimates, ĥ is a time domain transfer function that describes the channel estimates, h˜ is a time domain transfer function that describes the channel estimates with noise jitter removed, and n is an index in the time domain.

28. A receiver as in claim 27, where in a time varying environment the power threshold is adapted based on noise and interference power.

29. A receiver as in claim 25, where said channel estimation interpolation function orders time-domain channel estimates as:

$i_n$=ORDER{$|\hat{h}(n)|^2$}n=0,1,2,...,$L_p$-1, where ORDER{ } is a function to sort elements in ascending order and return an array of indices, and further comprises an accumulator to accumulate the power of the time-domain channel estimates from largest to smallest and sets a threshold on the accumulated power for zeroing the channel estimates outside of the threshold region in accordance with:

$$\tilde{h}(n) = \begin{cases} \hat{h}(i_n) & \text{if } \sum_{m=n}^{L_p-1} |\hat{h}(i_m)|^2 < \rho P_{all}, n = L_p - 1, \ldots, 0 \\ 0 & \text{otherwise,} \end{cases}$$

where 90% <p <95% is a percentage factor typically defined to be about one,
   where | | indicates the absolute value, 90% <p <95% is a percentage factor typically defined to be about one, $L_p$ is the number of pilot signals per symbol, $P_{all}$ is the total power of the time-domain channel estimates, ĥ is a time domain transfer function that describes the channel estimates, h˜ is a time domain transfer function that describes the channel estimates with noise jitter removed, n is an index in the time domain, m is an index of ordered elements, and $i_m$ and $i_n$ represent an ordered element corresponding to a sorted channel estimate.

30. A receiver as in claim 26, where said channel estimation interpolation function preserves time domain channel estimates at actual channel tap delays and sets the remainder to zero by:

$$\tilde{h}(n) = \begin{cases} \hat{h}(n) & \text{if } n \in \Gamma, n = 0, \ldots, L_p - 1, \\ 0 & \text{otherwise,} \end{cases}$$

where $\Gamma=\{\tau_l\}$ l=1, ..., L is a vector of the tap delays, $L_p$ is the number of pilot signals per symbol, ĥ is a time domain transfer function that describes the channel estimates, h˜ is a time domain transfer function that describes the channel estimates with noise jitter removed, n is an index in the time domain, and $i_n$ represents an ordered element corresponding to a sorted channel estimate.

31. A receiver as in claim 23, where said received pilot signals comprise comb-typepilot signals.

32. A receiver as in claim 23, embodied in a cellular telephone device.

33. A receiver of an orthogonal frequency division multiplex (OFDM) multicarrier wireless communications system, comprising:
channel estimator means for performing estimation over received pilot signals to obtain channel estimates;
equalizer means for operation in the frequency domain; and
channel estimation interpolation means for suppressing noise over a bandwidth of interest,
comprising means for transforming frequency domain channel estimates into the time domain;
means for suppressing the noise in the time domain channel estimates through one of the following techniques: 1) power-normalizing the time domain channel estimates and preserving the time domain channel estimates with power above a predefined threshold and setting a remainder of the time domain channel estimates to zero, 2) ordering the time domain channel estimates by power and accumulating the so-ordered time domain channel estimates from highest power to lowest until a threshold on the accumulated power is met and then setting a remainder of the time domain channel estimates to zero, and 3) preserving the time domain channel estimates at actual channel tap delays and setting a remainder of the time domain channel estimates to zero; and means for transforming the noise suppressed time domain channel estimates back to the frequency domain for input to said equalizer means, where frequency domain channel estimates are transformed into the time domain channel estimates by use of an inverse fast Fourier transform (IFFT) function having a length of a number of pilots per OFDM symbol, and where the noise suppressed time domain channel estimates are transformed back to the frequency domain for frequency domain equalization by a FFT operation having a length of the number of all subcarriers.

34. A receiver as in claim 33, where said channel estimation interpolation means preserves time-domain channel estimates with power larger than a predefined power threshold, and sets to zero those channel estimates with power less than the predefined power threshold as follows, $$\tilde{h}(n) = \begin{cases} \hat{h}(n) & \text{if } |\hat{h}(n)|^2 > P_t \\ 0 & \text{otherwise} \end{cases},$$

where | | indicates the absolute value, $P_t = pP_{all}$ is the power threshold, p is a weighting factor, and $$P_{all} = \sum_{n=0}^{L_p-1} |\hat{h}(n)|^2$$

is the total power of the time domain channel estimates, ĥ is a time domain transfer function that describes the channel estimates, h˜ is a time domain transfer function that describes the channel estimates with noise jitter removed, and n is an index in the time domain.

35. A receiver as in claim 33, where said channel estimation interpolation means orders time-domain channel estimates as:

$$i_n = \text{ORDER}\{|\hat{h}(n)|^2\} n=0,1,2,\ldots,L_p-1,$$

where ORDER{ } is a function to sort elements in ascending order and return an array of indices, and further comprises accumulator means for accumulating the power of the time-domain channel estimates from largest to smallest and means for setting a threshold on the accumulated power for zeroing the channel estimates outside of the threshold region in accordance with:

$$\tilde{h}(n) = \begin{cases} \hat{h}(i_n) & \text{if } \sum_{m=n}^{L_p-1} |\hat{h}(i_m)|^2 < \rho P_{all}, n = L_p - 1, \ldots, 0 \\ 0 & \text{otherwise} \end{cases},$$

where | | indicates the absolute value, 90% <p <95% is a percentage factor typically defined to be about one, $L_p$ is the number of pilot signals per symbol, $P_{all}$ is the total power of the time-domain channel estimates, ĥ is a time domain transfer function that describes the channel estimates, h˜ is a time domain transfer function that describes the channel estimates with noise jitter removed, n is an index in the time domain, m is an index of ordered elements, and $i_m$ and $i_n$ represent an ordered element corresponding to a sorted channel estimate.

36. A receiver as in claim 33, where said channel estimation interpolation means preserves time domain channel estimates at actual channel tap delays and sets the remainder to zero by:

$$\tilde{h}(n) = \begin{cases} \hat{h}(n) & \text{if } n \in \Gamma, n = 0, \ldots, L_p - 1 \\ 0 & \text{otherwise} \end{cases},$$

where $\Gamma = \{\tau_l\}$ l=1, ..., L is a vector of the tap delays.
where | | indicates the absolute value, 90% <p <95% is a percentage factor typically defined to be about one, $L_p$ is the number of pilot signals per symbol, $P_{all}$ is the total power of the time-domain channel estimates, ĥ is a time domain transfer function that describes the channel estimates, h˜ is a time domain transfer function that describes the channel estimates with noise jitter removed, n is an index in the time domain, m is an index of ordered elements, and $i_m$ and $i_n$ represent an ordered element corresponding to a sorted channel estimate.

37. computer readable medium encoded with a computer program comprising:
transforming frequency domain channel estimates into the time domain;
suppressing noise jitter in the time domain channel estimates through one of the following techniques: 1) power-normalizing the time domain channel estimates and preserving the time domain channel estimates with power above a predefined threshold and setting a remainder of the time domain channel estimates to zero, 2) ordering the time domain channel estimates by power and accumulating the so-ordered time domain channel estimates from highest power to lowest until a threshold on the accumulated power is met and then setting a remainder of the time domain channel estimates to zero, and 3) preserving the time domain channel estimates at actual channel tap delays and setting a remainder of the time domain channel estimates to zero; and transforming the noise suppressed time domain channel estimates back to the frequency domain for frequency domain equalization.

38. A computer readable medium encoded with a computer program as in claim 37, where the channel estimation is based on minimum mean-squared error (MMSE) estimation over comb-type pilot signals.

39. A computer readable medium encoded with a computer program as in claim 37, where the frequency domain channel estimates are transformed into the time domain channel estimates by use of an inverse fast Fourier transform (IFFT) function having a length of the number of pilots per symbol.

40. A computer readable medium encoded with a computer program as in claim 37, where suppressing noise jitter comprises using a predefined threshold of actual power or accumulative power to minimize the noise jitter over the bandwidth.

41. A computer readable medium encoded with a computer program as in claim 37, where suppressing noise jitter comprises using channel delay estimates made for framesynchronization purposes, preserving the channel estimates at actual tap delays and setting the others to zero.

42. A computer readable medium encoded with a computer program as in claim 40, where suppressing noise jitter comprises preserving time-domain channel estimates with power larger than a predefined power threshold, and setting to zero those channel estimates with power less than the predefined power threshold as follows, $$\tilde{h}(n) = \begin{cases} \hat{h}(n) & \text{if } |\hat{h}(n)|^2 < P_t \\ 0 & \text{otherwise} \end{cases},$$

where | | indicates the absolute value, $P_t = pP_{all}$ is the power threshold, p is a weighting factor, and $$P_{all} = \sum_{n=0}^{L_p-1} |\hat{h}(n)|^2$$

is the total power of the time domain channel estimates, $\hat{h}$ is a time domain transfer function that describes the channel estimates, $\tilde{h}$ is a time domain transfer function that describes the channel estimates with noise jitter removed, and n is an index in the time domain.

43. A computer readable medium encoded with a computer program as in claim 42, where in a time varying environment the power threshold is adapted based on noise and interference power.

44. A computer readable medium encoded with a computer program as in claim 40, where suppressing noise jitter comprises ordering time-domain channel estimates as:

$i_n$ =ORDER $\{|\hat{h}(n)|^2\}n=0,1,2,\ldots,L_p-1,$ where ORDER{ } is a function to sort elements in ascending order and return an array of indices, further comprising accumulating the power of the time-domain channel estimates from largest to smallest, and setting a threshold on the accumulated power for zeroing the channel estimates outside of the threshold region in accordance with:

$$\tilde{h}(n) = \begin{cases} \hat{h}(i_n) & \text{if } \sum_{m=n}^{L_p-1} |\hat{h}(i_m)|^2 < \rho P_{all}, n = L_p - 1, \ldots, 0 \\ 0 & \text{otherwise} \end{cases},$$

where | | indicates the absolute value, 90% <p <95% is a percentage factor typically defined to be about one, $L_p$ is the number of pilot signals per symbol, $P_{all}$ is the total power of the time-domain channel estimates, $\hat{h}$ is a time domain transfer function that describes the channel estimates, $\tilde{h}$ is a time domain transfer function that describes the channel estimates with noisejitter removed, n is an index in the time domain, m is an index of ordered elements, and $i_m$ and $i_n$ represent anordered element corresponding to a sorted channel estimate.

45. A computer readable medium encoded with a computer program as in claim 41, where suppressing noise jitter comprises preserving those time domain channel estimates at actual channel tap delays and setting the remainder to zero by:

$$\tilde{h}(n) = \begin{cases} \hat{h}(n) & \text{if } n \in \Gamma, n = 0, \ldots, L_p - 1 \\ 0 & \text{otherwise} \end{cases},$$

where $\Gamma=\{\tau_{l}\}$ l=1, ..., L is a vector of the tap delays, $L_p$ is the number of pilot signals per symbol, $\hat{h}$ is a time domain transfer function that describes the channel estimates, $\tilde{h}$ is a time domain transfer function that describes the channel estimates with noise jitter removed, n is an index in the time domain, and $i_n$ represents an ordered element corresponding to a sorted channel estimate.

46. A computer readable medium encoded with a computer program as in claim 37, where the noise suppressed time domain channel estimates are transformed back to frequency domain for frequency domain equalization by a FFT operation having a length of the number of all subcarriers.

47. A computer readable medium encoded with a computer program as in claim 37, where the channel estimation is based on a least squares estimation over comb-type pilot signals.

48. A computer readable medium encoded with a computer program as in claim 37, embodied in a wireless communications terminal.

49. A circuit comprising:

a channel estimator;

a frequency equalizer; and a channel estimation interpolation function to suppress noise jitter over a bandwidth of interest, comprising a unit to transform frequency domain channel estimates into the time domain; a unit to suppress the noise jitter in the time domain channel estimates through one of the following techniques: 1) power-normalizing the time domain channel estimates and preserving the time domain channel estimates with power above a predefined threshold and setting a remainder of the time domain channel estimates to zero, 2) ordering the time domain channel estimates by power and accumulating the so-ordered time domain channel estimates from highest power to lowest until a threshold on the accumulated power is met and then setting a remainder of the time domain channel estimates to zero, and 3) preserving the time domain channel estimates at actual channel tap delays and setting a remainder of the time domain channel estimates to zero; and a unit to transform the noise suppressed time domain channel estimates back to the frequency domain for input to said frequency equalizer.

50. A circuit as in claim 49, where said channel estimation interpolation function uses a predefined threshold of actual power to minimize the noise jitter over the bandwidth.

51. A circuit as in claim 49, where said channel estimation interpolation function uses a predefined threshold of accumulative power to minimize the noise jitter over the bandwidth.

52. A circuit as in claim 49, where said channel estimation interpolation function uses channel delay estimates made for frame synchronization purposes, and preserveschannel estimates at actual tap delays and sets the others to zero.

53. A mobile user device, comprising:
   a receiver, comprising:
   a channel estimator;
   a frequency equalizer; and
   a channel estimation interpolation function to suppress noise jitter over a bandwidth of interest, comprising a unit to transform frequency domain channel estimates into the time domain; a unit to suppress the noise jitter in the time domain channel estimates through one of the following techniques: 1) power-normalizing the time domain channel estimates and preserving the time domain channel estimates with power above a predefined threshold and setting a remainder of the time domain channel estimates to zero, 2) ordering the time domain channel estimates by power and accumulating the so-ordered time domain channel estimates from highest power to lowest until a threshold on the accumulated power is met and then setting a remainder of the time domain channel estimates to zero, and 3) preserving the time domain channel estimates at actual channel tap delays and setting a remainder of the time domain channel estimates to zero; and a unit to transform the noise suppressed time domain channel estimates back to the frequency domain for input to said frequency equalizer.

54. A mobile user device as in claim 53, where said channel estimation interpolation function uses a predefined threshold of actual power to minimize the noise jitter over the bandwidth.

55. A mobile user device as in claim 53, where said channel estimation interpolation function uses a predefined threshold of accumulative power to minimize the noise jitter over the bandwidth.

56. A mobile user device as in claim 53, where said channel estimation interpolation function uses channel delay estimates made for frame synchronization purposes, and preserves channel estimates at actual tap delays and sets the others to zero.

* * * * *

UNITED STATES PATENT AND TRADEMARK OFFICE
CERTIFICATE OF CORRECTION

PATENT NO. : 7,412,005 B2 Page 1 of 1
APPLICATION NO. : 10/783129
DATED : August 12, 2008
INVENTOR(S) : Wang et al.

It is certified that error appears in the above-identified patent and that said Letters Patent is hereby corrected as shown below:

Claim 41, column 17, lines 24-25, please delete "framesynchronization" and replace with --frame synchronization--.

Claim 42, column 17, line 28, delete "inclaim" and replace with --in claim--.

Claim 42, column 17, line 29, delete "estimateswith" and replace with --estimates with--.

Claim 44, column 18, line 14, delete "noisejitter" and replace with --noise jitter--.

Claim 44, column 18, lines 15-16, delete "anordered" and replace with --an ordered--.

Claim 52, column 19, line 12, delete "preserveschannel" and replace with --preserves channel--.

Signed and Sealed this

Twenty-first Day of October, 2008

JON W. DUDAS
*Director of the United States Patent and Trademark Office*